(12) United States Patent
Mahafzah

(10) Patent No.: US 10,380,224 B2
(45) Date of Patent: *Aug. 13, 2019

(54) RULES BASED CONTENT MANAGEMENT SYSTEM AND METHOD

(71) Applicant: HSC Acquisition, LLC, Mahwah, NJ (US)

(72) Inventor: Ala Mahafzah, Wayne, NJ (US)

(73) Assignee: HSC Acquisition, LLC, Mahwah, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/102,022

(22) Filed: Aug. 13, 2018

(65) Prior Publication Data

US 2018/0349328 A1 Dec. 6, 2018

Related U.S. Application Data

(63) Continuation of application No. 13/846,009, filed on Mar. 18, 2013, now Pat. No. 10,049,084.

(51) Int. Cl.
*G06F 17/00* (2019.01)
*G06F 17/21* (2006.01)
*G06F 16/438* (2019.01)

(52) U.S. Cl.
CPC ........ *G06F 17/211* (2013.01); *G06F 16/4393* (2019.01)

(58) Field of Classification Search
CPC ............. G06F 17/211; G06F 17/30056; G06F 16/4393
USPC ................................................. 715/255, 202
See application file for complete search history.

(56) References Cited

U.S. PATENT DOCUMENTS

| | | | |
|---|---|---|---|
| 5,509,112 | A | 4/1996 | Doi et al. |
| 5,781,190 | A | 7/1998 | Gorbet et al. |
| 7,493,561 | B2 | 2/2009 | Sareen et al. |
| 7,703,003 | B2 | 4/2010 | Payne et al. |
| 7,743,323 | B1 | 6/2010 | Rodriguez |
| 7,814,404 | B2 | 10/2010 | Shenfield |
| 7,836,110 | B1 | 11/2010 | Schoenbach et al. |

(Continued)

FOREIGN PATENT DOCUMENTS

| | | |
|---|---|---|
| JP | H08249385 A | 9/1996 |
| JP | 2000149045 A | 5/2000 |

(Continued)

OTHER PUBLICATIONS

Little et al., Interval-Based Conceptual Models for Time-Dependent Multimedia Data, IEEE 1993, pp. 551-563. (Year: 1993).*

(Continued)

*Primary Examiner* — Cong-Lac Huynh
(74) *Attorney, Agent, or Firm* — Taft Stettinius & Hollister LLP

(57) ABSTRACT

In a method for generating a presentation, a computer communicates data representative of a plurality of presentation components. A computer receives data representative of a presentation component selected from the plurality of presentation components. A computer retrieves a predefined rule associated with the selected presentation component. A computer applies the rule associated with the selected presentation component. A computer inserts the presentation component in a presentation.

20 Claims, 5 Drawing Sheets

(56) References Cited

U.S. PATENT DOCUMENTS

| | | |
|---|---|---|
| 7,996,767 B2 | 8/2011 | Lee et al. |
| 8,214,518 B1 | 7/2012 | Bertz |
| 8,341,528 B2 | 12/2012 | Chaudhary et al. |
| 8,434,002 B1* | 4/2013 | Shah ............... G06F 17/212 715/200 |
| 8,856,659 B2 | 10/2014 | Mindrum |
| 9,058,396 B2 | 6/2015 | Kim et al. |
| 9,436,685 B2 | 9/2016 | Roth et al. |
| 9,715,485 B2 | 7/2017 | Roth et al. |
| 2002/0103737 A1 | 8/2002 | Briere |
| 2002/0178093 A1 | 11/2002 | Dean et al. |
| 2003/0066028 A1 | 4/2003 | Payne et al. |
| 2004/0015783 A1 | 1/2004 | Lennon et al. |
| 2004/0205479 A1* | 10/2004 | Seaman ............ G06F 17/30056 715/202 |
| 2004/0259068 A1 | 12/2004 | Philipp et al. |
| 2005/0119990 A1 | 6/2005 | Lee et al. |
| 2005/0138198 A1 | 6/2005 | May |
| 2005/0188402 A1* | 8/2005 | de Andrade ....... H04N 5/44543 725/46 |
| 2006/0037052 A1 | 2/2006 | McDowell et al. |
| 2006/0085369 A1 | 4/2006 | Bauer et al. |
| 2006/0253213 A1 | 11/2006 | Ocke et al. |
| 2007/0118801 A1* | 5/2007 | Harshbarger ........ G11B 27/031 715/730 |
| 2007/0130177 A1 | 6/2007 | Schneider et al. |
| 2009/0198542 A1 | 8/2009 | D'Amore et al. |
| 2010/0083358 A1 | 4/2010 | Govindarajan et al. |
| 2010/0088605 A1 | 4/2010 | Livshin et al. |
| 2010/0122220 A1 | 5/2010 | Ainsworth et al. |
| 2010/0136509 A1 | 6/2010 | Mejer et al. |
| 2010/0178902 A1 | 7/2010 | Boctor |
| 2010/0191554 A1 | 7/2010 | Singh et al. |
| 2011/0078560 A1* | 3/2011 | Weeldreyer .......... G06F 17/214 715/255 |
| 2011/0178854 A1 | 7/2011 | Sofer et al. |
| 2011/0179344 A1* | 7/2011 | Paxson .................. G06Q 10/00 715/205 |
| 2011/0252031 A1 | 10/2011 | Blumenthal et al. |
| 2011/0314053 A1 | 12/2011 | Morikawa et al. |
| 2012/0095817 A1 | 4/2012 | Kamil et al. |
| 2012/0110196 A1 | 5/2012 | Balasaygun et al. |
| 2012/0110443 A1 | 5/2012 | Lemonik et al. |
| 2012/0136804 A1 | 5/2012 | Lucia, Sr. et al. |
| 2012/0192086 A1 | 7/2012 | Ghods et al. |
| 2012/0215737 A1 | 8/2012 | Jennings |
| 2012/0243848 A1 | 9/2012 | Martin |
| 2012/0246105 A1 | 9/2012 | James |
| 2012/0284605 A1 | 11/2012 | Sitrick et al. |
| 2013/0073449 A1 | 3/2013 | Voynow et al. |
| 2013/0144714 A1 | 6/2013 | Yuan et al. |
| 2014/0095254 A1 | 4/2014 | Chauhan et al. |
| 2014/0122595 A1 | 5/2014 | Murdoch et al. |
| 2014/0180970 A1* | 6/2014 | Hettenkofer ........... G06N 5/025 706/11 |
| 2014/0207870 A1 | 7/2014 | Vaya |
| 2014/0250056 A1 | 9/2014 | Kuspa |
| 2014/0380171 A1 | 12/2014 | Maloney et al. |
| 2015/0010894 A1 | 1/2015 | Morisset |
| 2015/0143243 A1 | 5/2015 | Balfe |
| 2015/0170303 A1 | 6/2015 | Gediz et al. |
| 2015/0177964 A1 | 6/2015 | Spirer |
| 2015/0212982 A1* | 7/2015 | Berger ............. G06F 17/30274 715/255 |
| 2015/0243177 A1* | 8/2015 | Heikkila ................. G09B 5/06 434/157 |
| 2015/0332397 A1 | 11/2015 | Clarke et al. |
| 2016/0012027 A9 | 1/2016 | Rebstock et al. |
| 2016/0253741 A1 | 9/2016 | Otto et al. |
| 2017/0000450 A1 | 1/2017 | Ferro, Jr. |
| 2017/0046317 A1* | 2/2017 | Geva .................... G06F 17/211 |
| 2017/0090854 A1* | 3/2017 | Richardson ............ G06F 3/165 |
| 2017/0092331 A1* | 3/2017 | Eppolito ............. G11B 27/031 |
| 2017/0177553 A1* | 6/2017 | Bruner .................... G06F 17/24 |
| 2018/0349892 A1* | 12/2018 | Lattanzio ............... G06Q 20/40 |

FOREIGN PATENT DOCUMENTS

| | | |
|---|---|---|
| JP | 2006126881 A | 5/2006 |
| WO | 2010076562 A1 | 7/2010 |

OTHER PUBLICATIONS

European Office Action; European Patent Office; European Patent Application No. 14724812.4; dated Aug. 22, 2018; 7 pages.

Japanese Office Action; Japanese Patent Office; Japanese Patent Application No. 2016-504303; dated Oct. 2, 2018; 2 pages.

Franklin et al., Plan-based Interfaces: Keeping Track of User Tasks and Acting to Cooperate, ACM 2002, pp. 79-86.

Bergman et al., Outline Wizard: Presentation Composition and Search, ACM 2010, pp. 209-218.

International Search Report issued for PCT/US2014/022356 dated Sep. 16, 2014.

Written Opinion issued for PCT/US2014/022356 dated Sep. 16, 2014.

Japanese Notice of Grounds of Rejection; Japanese Patent Office; Japanese Patent Application No. 2016-504303; dated Mar. 6, 2018; 6 pages.

* cited by examiner

US 10,380,224 B2

RULES BASED CONTENT MANAGEMENT SYSTEM AND METHOD

CROSS REFERENCE TO RELATED APPLICATIONS

The present application is a continuation of U.S. patent application Ser. No. 13/846,009 filed on Mar. 18, 2013 and issued as U.S. Pat. No. 10,049,084, the contents of which are hereby incorporated by reference in their entirety.

FIELD OF INVENTION

The present disclosure relates to the field of managing content of a presentation. More particularly, the present invention relates to a rules based content management system and method for managing content of a presentation.

BACKGROUND

Digital presentations are used to educate and inform audiences on particular subjects as well as to market products and services. Furthermore, presentations are used in a variety of industries and in a variety of different applications. For example, a drug company representative may use a presentation to educate a medical professional about the benefits of a particular drug. Tools such as Microsoft PowerPoint, for example, enable a user to create such presentation.

In certain industries, a user may be required to adhere to specific rules and regulations in terms of the type of content that can be included in such presentations and the format in which the content is presented. However, a user creating a presentation may not be familiar with the industry specific rules which a presentation must adhere to or may inadvertently overlook the rules when creating a presentation.

SUMMARY OF THE INVENTION

In a method for generating a presentation, a computer communicates data representative of a plurality of presentation components. A computer receives data representative of a presentation component selected from the plurality of presentation components. A computer retrieves a predefined rule associated with the selected presentation component. A computer applies the rule associated with the selected presentation component. A computer inserts the presentation component in a presentation.

A system for generating a presentation comprises at least one processor, at least one computer-readable tangible storage device, and program instructions stored on the at least one storage device for execution by the at least one processor. The program instructions comprise first program instructions configured to communicate data representative of a plurality of presentation components. The program instructions further comprise second program instructions configured to receive data representative of a presentation component selected from the plurality of presentation components. The program instructions further comprise third program instructions configured to retrieve a predefined rule associated with the selected presentation component. The program instructions further comprise fourth program instructions configured to apply the rule associated with the selected presentation component. The program instructions further comprise fifth program instructions configured to insert the presentation component in a presentation.

A computer program product for generating a presentation comprises at least one computer-readable tangible storage device and program instructions stored on the at least one storage device. The program instructions comprise first program instructions configured to communicate data representative of a plurality of presentation components. The program instructions further comprise second program instructions configured to receive data representative of a presentation component selected from the plurality of presentation components. The program instructions further comprise third program instructions configured to retrieve a predefined rule associated with the selected presentation component. The program instructions further comprise fourth program instructions configured to apply the rule associated with the selected presentation component. The program instructions further comprise fifth program instructions configured to insert the presentation component in a presentation.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
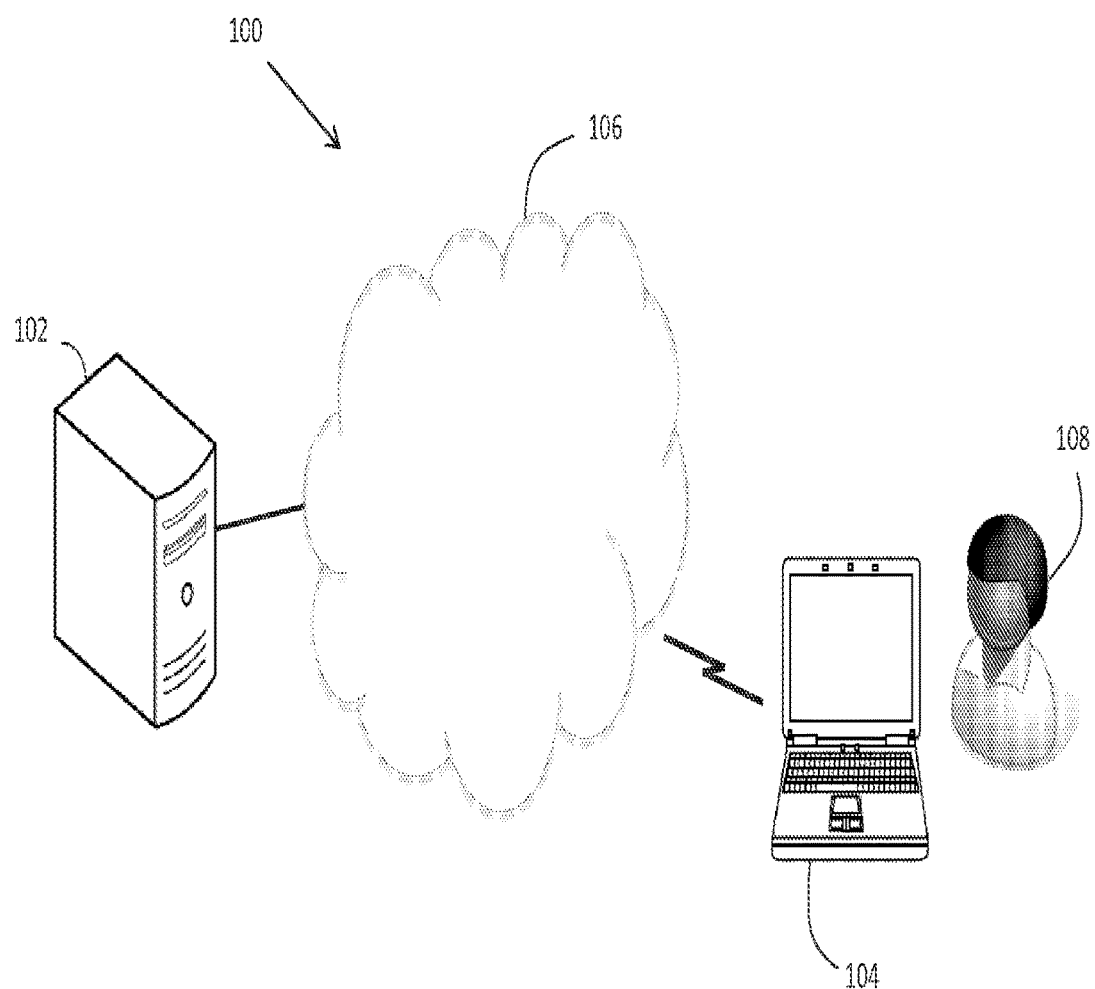
FIG. 1 illustrates an example rules based content management system for managing content of a presentation.

The following includes definitions of selected terms employed herein. The definitions include various examples, forms, or both of components that fall within the scope of a term and that may be used for implementation. The examples are not intended to be limiting. Both singular and plural forms of terms may be within the definitions.

"Computer communication," as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11, IEEE 802.15), an Ethernet system (e.g., IEEE 802.3), a token ring system (e.g., IEEE 802.5), a local area network (LAN), a wide area network (WAN), a point-to-point system, a circuit switching system, a packet switching system, combinations thereof, and so on.

"Computer-readable medium," as used herein, refers to a medium that participates in directly or indirectly providing signals, instructions, or data. A computer-readable medium may take forms, including, but not limited to, non-volatile media, volatile media, and transmission media. Non-volatile media may include, for example, optical or magnetic disks, and so on. Volatile media may include, for example, optical or magnetic disks, dynamic memory, and the like. Transmission media may include coaxial cables, copper wire, fiber optic cables, and the like. Transmission media can also take the form of electromagnetic radiation, like that generated during radio-wave and infra-red data communications, or take the form of one or more groups of signals. Common forms of a computer-readable medium include, but are not limited to, a floppy disk, a flexible disk, a hard disk, a magnetic tape, other magnetic media, a CD-ROM, other optical media, punch cards, paper tape, other physical media with patterns of holes, a RAM, a ROM, an EPROM, a FLASH-EPROM, or other memory chip or card, a memory stick, a carrier wave/pulse, Phase Change Memory, and other media from which a computer, a processor, or other electronic device can read. Signals used to propagate instructions or other software over a network, like the Internet, can be considered a "computer-readable medium."

"Data store," as used herein, refers to a physical or logical entity that can store data. A data store may be, for example, a database, a table, a file, a list, a queue, a heap, a memory, a register, and so on. A data store may reside in one logical or physical entity or may be distributed between two or more logical or physical entities.

"Logic," as used herein, includes but is not limited to hardware, firmware, software, or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

"Software," as used herein, includes but is not limited to, one or more computer or processor instructions that can be read, interpreted, compiled, or executed and that cause a computer, processor, or other electronic device to perform functions, actions, or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servelet, an applet, instructions stored in a memory, part of an operating system, or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in serial, parallel, massively parallel, and other manners.

Suitable software for implementing the various components of the example systems and methods described herein may be produced using programming languages and tools like Java, Java Script, Java.NET, ASP.NET, VB.NET, Cocoa, Pascal, C#, C++, C, CGI, Perl, SQL, APIs, SDKs, assembly, firmware, microcode, or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User," as used herein, includes but is not limited to one or more persons, software, computers or other devices, or combinations of these.

FIG. 1 illustrates an example system 100 for managing content of a presentation. System 100 includes a content management server 102 configured to manage content being added to a presentation by enforcing rules associated with the content. Content management server 102 communicates with a computer 104 via Internet 106. Computer 104 provides a user 108 with an interface (not shown) for adding content to a presentation. By managing content being added to a presentation, content management server 102 enables user 108 to create presentations that adhere to industry specific rules and standards, even when user 108 may not be familiar with the rules or when user 108 may not remember to enforce the rules.

A presentation, in one example, is a slideshow, such as a Microsoft PowerPoint slideshow. In such an example, content includes pages or slides to be added to the slideshow. In another example, a presentation may include other forms of digital media such as a video presentation, an audio presentation, a document, or other suitable forms of presenting information. In such examples, content may include video clips, audio clips, document pages, and so on.

Rules associated with presentation content may include various legal standards, compliance standards, or other types of standards, restrictions, or guidelines, either general or specific to an industry. Rules may dictate what information may be presented, in what order information may be presented, to whom information may be presented, and so on. For example, pharmaceutical industry regulations may require a pharmaceutical representative to present Important Safety Information relating to a drug before presenting promotional material relating to the drug. Accordingly, a slide that promotes the benefits of a drug may have an associated rule which prevents the slide from being added to a presentation unless the presentation already includes a preceding slide that conveys the Important Safety Information.

Although the example system and method described herein makes reference to managing presentation content for the pharmaceutical industry, it should be understood that the example system and method may similarly be used to manage presentation content for various industries and in various applications in which the content of presentations may be subject to industry rules and regulations.

It should be understood that, although content management server 102 is depicted as being in wired communication to Internet 106, content management server 102 may also be in wireless communication with Internet 106. Similarly, although computer 104 is depicted as being in wireless communication to Internet 106, computer 104 may also be in wired communication to Internet 106.

Although not illustrated, it should be further understood that the functionality of the backend content management server 102 and the functionality of the front end computer 104 may be combined into a single computer. In such an example, a single computer may provide both back-end rules based content management as well as a front end user interface.

Figure 2:
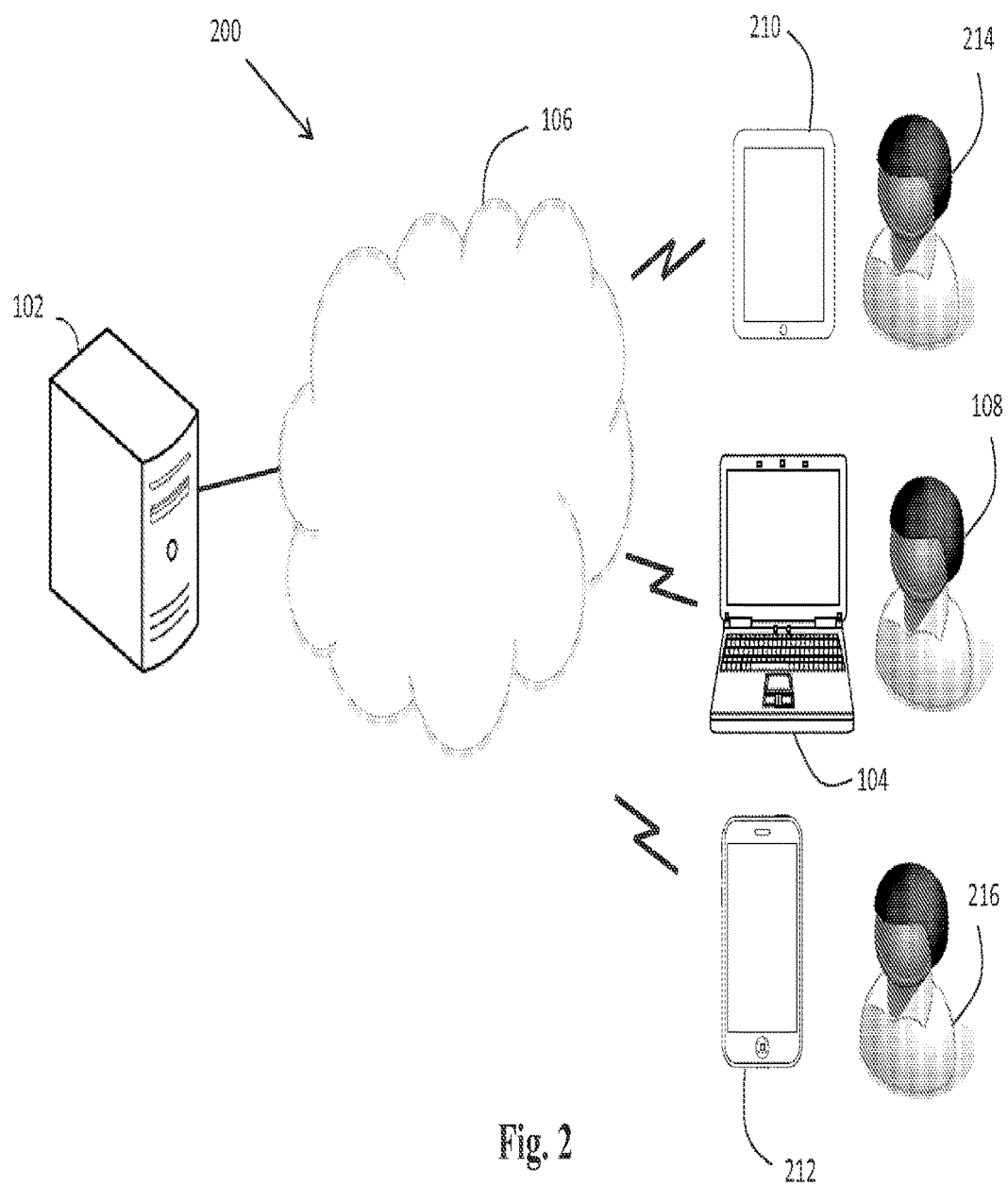
FIG. 2 illustrates an example rules based content management system for managing content of a presentation.

It should be further understood that, although system 100 depicts a single user 108 interacting with a single computer 104, system 100 may comprise multiple users interacting with multiple devices to create multiple presentations. In addition, although computer 104 is depicted as a laptop personal computer, it should be understood that computer 104 may also include any type of similar computing device capable of communicating with content management server 102 and providing user 108 an interface for adding content to a presentation. For example, computer 104 may include a mobile phone such as a smartphone, a tablet computer, a desktop computer, and so on. FIG. 2 illustrates another example system 200 for managing content of a presentation including multiple users and multiple computing devices. In addition to content management server 102 communicating with computer 104 which provides user 108 with an interface for adding content to a presentation, content management server 102 also communicates with tablet computer 210 and mobile phone 212 which provide interfaces to users 214 and 216, respectively.

Figure 3:
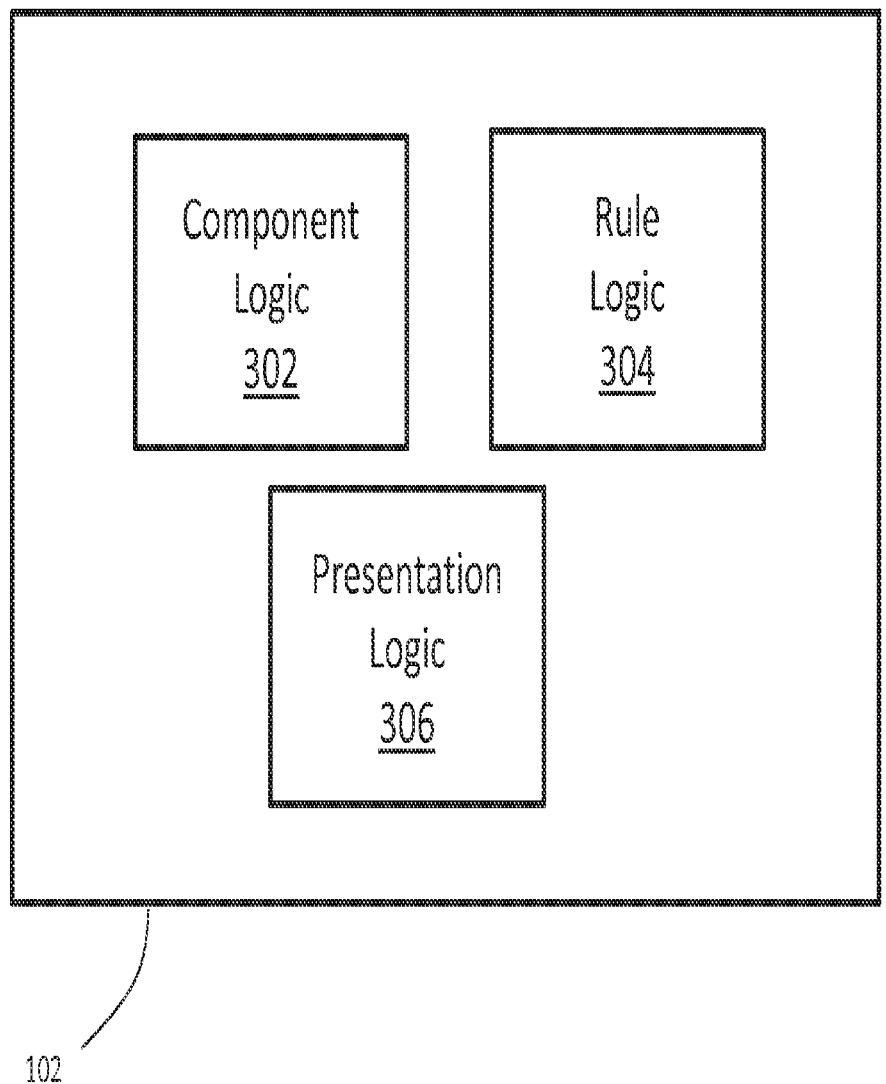
FIG. 3 illustrates a block diagram of an example computer of FIG. 1 for managing content of a presentation.

FIG. 3 illustrates a block diagram of an example content management server 102 of FIG. 1 and FIG. 2. Content management server 102 includes component logic 302 configured to communicate a set of presentation components to computer 104. Computer 104 is in turn configured to enable user 108 to select one or more components from the set of components to include in a presentation. In one example, component logic 302 is configured to communicate metadata associated with the components, rather than the complete components. For example, component logic 302 may communicate thumbnails, video clips, time codes duration, ratings, playlist names, security rights, workflow information, validation rules, or other suitable metadata associated with the components.

In one example, component logic 302 may be configured to receive login credentials of user 108. In such an example, component logic 302 may be configured to communicate a subset of components, based on the login credentials. For example, a systems administrator may choose to enable a first user to select from a first set of components and to enable a second user to select from a second set of components. Accordingly, component logic 302 may be configured to communicate the first set of components to computer 104 when the first user logs in and to communicate the second set of components to computer 104 when the second user logs in.

Component logic 320 is further configured to receive a selection of presentation components, selected from the set of communicated presentation components. In one example, component logic is configured to receive metadata associated with the selected components.

Content management server 102 further includes rule logic 304 configured to retrieve predefined rules associated with the selected presentation components. In one example, a systems administrator may predefine and store rules locally at content management server 102. Accordingly, rule logic 304 may be configured to retrieve rules from a database (not shown) hosted by content management server 102. In another example, rule logic 304 may be configured to retrieve rules from a third party service provider hosting such rules.

Rule logic 304 is further configured to apply the rules associated with the presentation components. In one example, rule logic 304 is configured to request a response to a question and to verify that the received response corresponds to an expected response. For example, certain industry regulations may require that specific presentation components only be presented to individuals who meet specific minimum professional qualifications. Accordingly, rule logic 304 may be configured to request confirmation that a certain component has been selected with the intention of presenting the component only to such a person meeting the minimum qualifications and to prevent the inclusion of the component in the presentation if confirmation is not received.

Content management server 102 includes presentation logic 306 configured to insert presentation components in a presentation according to determinations made by rule logic 304. In other words, rule logic 304 is configured to communicate with presentation logic 306 and to inform presentation logic 306 of what presentation components may be added to a presentation.

In another example, rule logic 304 is configured to determine that a rule requires a second presentation component to be inserted in the presentation. In such an example, presentation logic 306 is configured to automatically insert the second presentation component in the presentation. For example, a pharmaceutical industry regulation may require that a healthcare professional be presented with Important Safety Information relating to a drug before being presented with promotional material relating to the drug. Accordingly, presentation logic 304 may be configured to automatically include, in the presentation, a presentation component associated with Important Safety Information about a drug upon rule logic 304 determining that a selected presentation component relates to promotional material about the drug. In addition, presentation logic 306 may be configured to automatically insert the second presentation component in the presentation in such a way as to insure that the second presentation component is presented prior to the selected presentation component being presented in order to ensure compliance with a rule.

In another example, presentation logic 304 may not be configured to automatically insert the second presentation component in the presentation upon rule logic 304 determining that a rule requires the second presentation component. Rather, rule logic 304 may be configured to request confirmation to proceed with adding the second presentation component to the presentation. Presentation logic 306, in turn, may be configured to insert the second presentation component in the presentation only upon rule logic 304 receiving confirmation. In such an example, rule logic 304 may be configured to prevent presentation logic 306 from adding the selected presentation component to the presentation unless confirmation is received.

Presentation logic 306 may be further configured to receive a request to transfer the presentation and to transfer the presentation, including both the selected presentation components and the presentation components determined to be required by associated rules, to computer 104.

Figure 4:
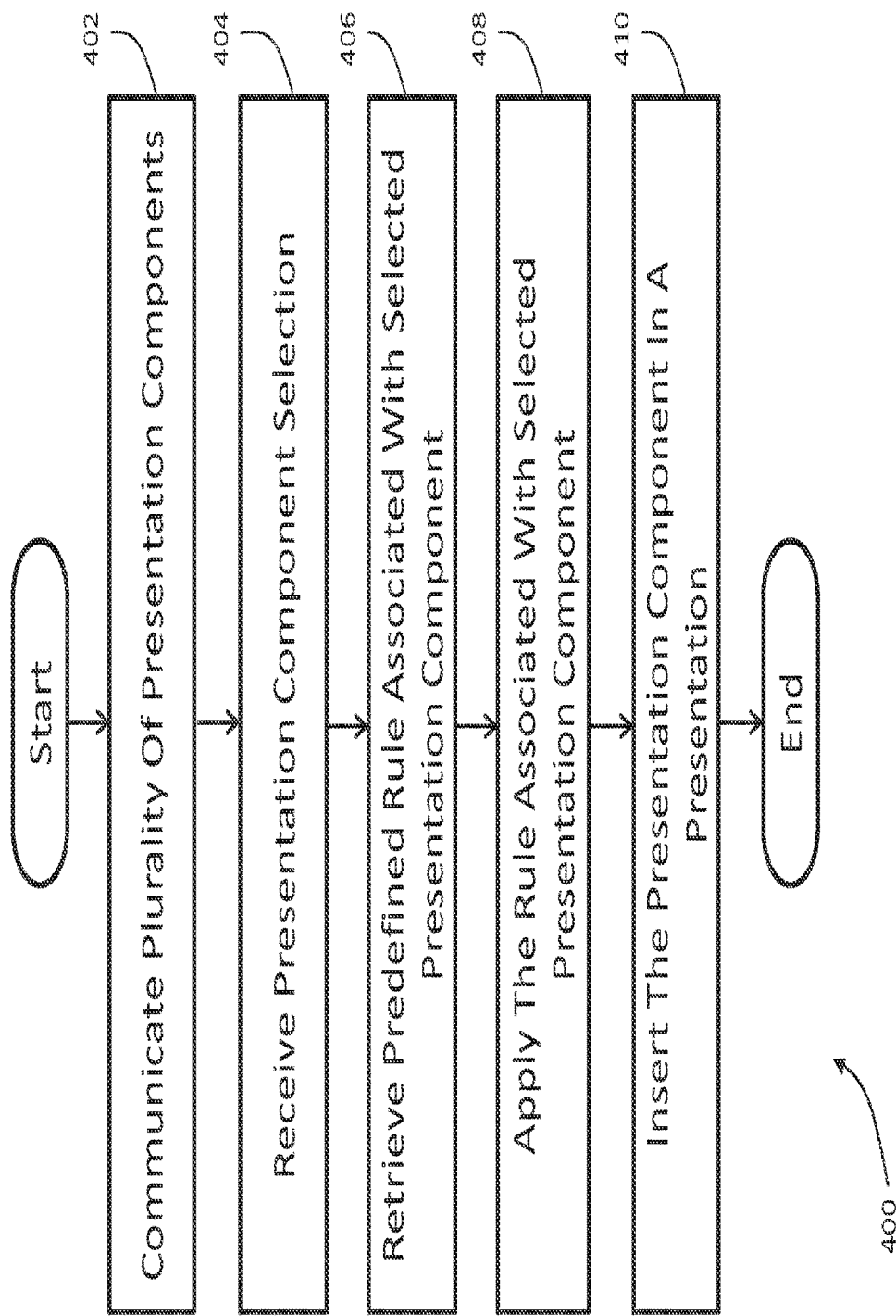
FIG. 4 is a flow chart illustrating an example rules based method for managing content of a presentation.

FIG. 4 is a flow chart illustrating an example method for managing content of a presentation. At step 402, content management server 102 communicates a set of presentation components to computer 104. At step 404, upon user 108 selecting one or more presentation components via computer 104, content management server 102 receives a presentation component selected from the set of communicated presentation components. At step 406, content management server 102 retrieves a predefined rule associated with the selected presentation component. At step 408, content management server 102 applies the retrieved rule associated with the selected presentation component. At step 410, content management server 102 inserts the selected presentation component into a presentation.

Figure 5:
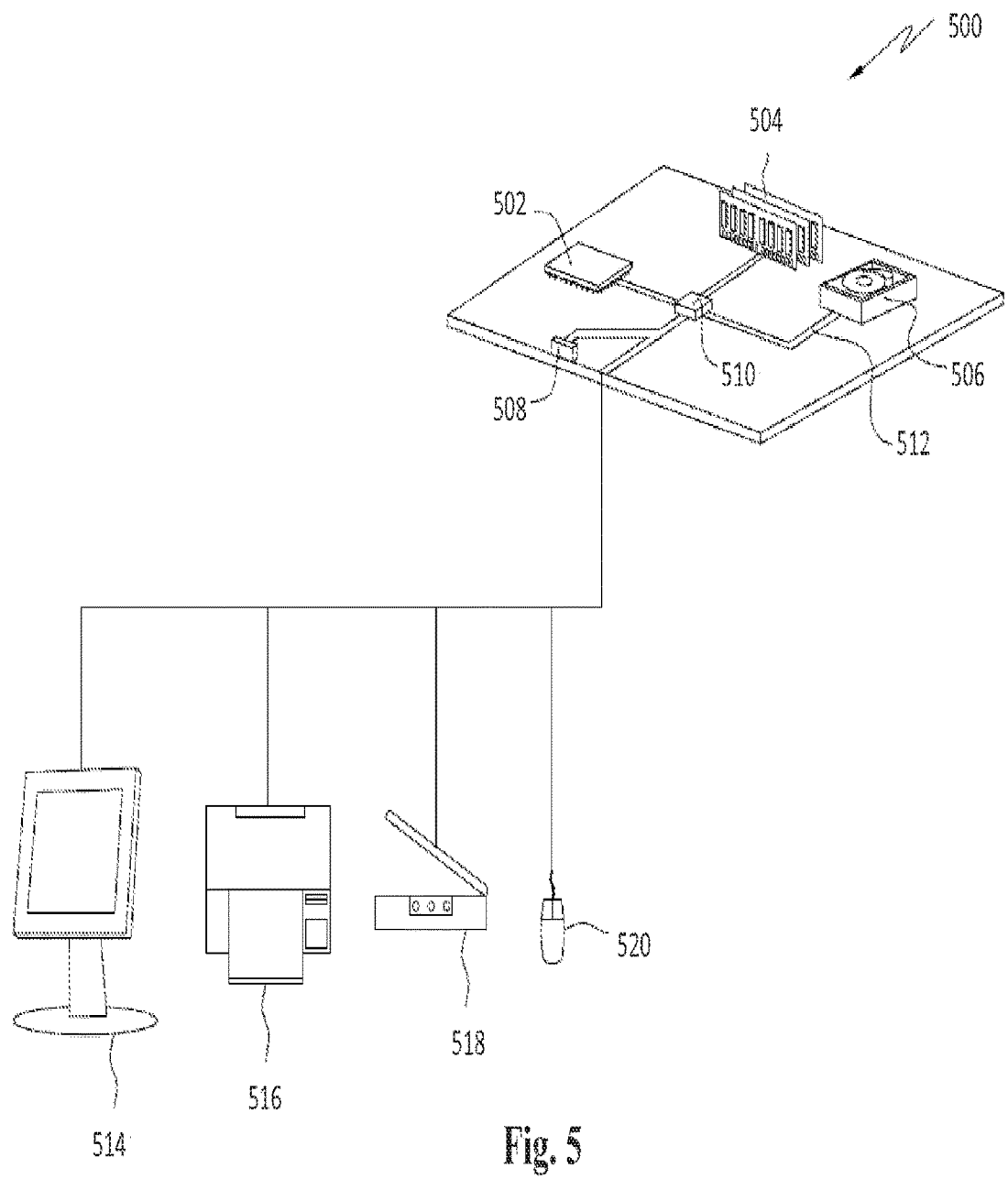
FIG. 5 is a schematic diagram of an example computer of FIG. 1 for managing content of a presentation.

FIG. 5 is a block diagram of an example computer 500 for implementing the content management server 102 of FIG. 1 and FIG. 2. The example computer 500 is intended to represent various forms of digital computers, including laptops, desktops, handheld computers, tablet computers, servers, and other similar types of computing devices. Computer 500 includes a processor 502, memory 504, a storage device 506, and a communication port 508, operably connected by an interface 510 via a bus 512.

Storage device 506 can store component logic 302, rule logic 304, and presentation logic 306.

Processor 502 processes instructions, via memory 504, for execution within computer 500. In an example embodiment, multiple processors along with multiple memories may be used.

Memory 504 may be volatile memory or non-volatile memory. Memory 504 may be a computer-readable medium, such as a magnetic disk or optical disk. Storage device 506 may be a computer-readable medium, such as floppy disk devices, a hard disk device, optical disk device, a tape device, a flash memory, phase change memory, or other similar solid state memory device, or an array of devices, including devices in a storage area network of other configurations. A computer program product can be tangibly embodied in a computer readable medium such as memory 504 or storage device 406. The computer program product may contain component logic 302, rule logic 304, and presentation logic 306.

Computer 500 can be coupled to one or more input and output devices such as a display 514, a printer 516, a scanner 518, and a mouse 520.

While example systems, methods, and so on, have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

Some portions of the detailed descriptions are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

The invention claimed is:

1. A content management server, comprising:
at least one processor; and
at least one memory comprising a plurality of instructions stored thereon that, in response to execution by the at least one processor, causes the content management server to:
transmit data that identifies a plurality of presentation components to a computing device;
receive, from the computing device, a user selection of a first presentation component selected from the plurality of presentation components in response to transmittal of the data that identifies the plurality of presentation components;
evaluate content of the first presentation component relative to a first rule retrieved from a database of the content management server, wherein the first rule defines a presentation sequence for the first presentation component in a presentation based on the content of the first presentation component; and
insert the first presentation component and a second presentation component selected from the plurality of presentation components into the presentation such that the second presentation component is prior in sequence to the first presentation component based on an evaluation of the content of the first presentation component relative to the first rule.

2. The content management server of claim 1, wherein the second presentation component is automatically inserted into the presentation prior in sequence to the first presentation component in response to a determination to insert the first presentation component into the presentation.

3. The content management server of claim 1, wherein to insert the first presentation component and the second presentation component into the presentation comprises to:
transmit a request to the computing device to insert the second presentation component; and
insert the first presentation component and the second presentation component into the presentation in response to receipt of confirmation from the computing device to insert the second presentation component.

4. The content management server of claim 3, wherein insertion of the first presentation component into the presentation is prevented until confirmation is received from the computing device to insert the second presentation component.

5. The content management server of claim 1, wherein to transmit the data that identifies the plurality of presentation components comprises to transmit metadata associated with the plurality of presentation components.

6. The content management server of claim 1, wherein the plurality of presentation components is a first plurality of presentation components; and
wherein the plurality of instructions further causes the content management server to (i) receive user credentials of a first user from the computing device and (ii) identify, based on the user credentials of the first user, the first plurality of presentation components to which the first user is authorized to access from a superset of presentation components.

7. The content management server of claim 6, wherein the plurality of instructions further causes the content management server to:
receive user credentials of a second user; and
identify, based on the user credentials of the second user, a second plurality of presentation components to which the second user is authorized to access from the superset of presentation components.

8. The content management server of claim 1, wherein the plurality of instructions further causes the content management server to:
receive a request from the computing device to transfer the presentation to the computing device subsequent to insertion of the first presentation component and the second presentation component into the presentation; and
transfer the presentation to the computing device in response to receipt of the request.

9. A computer-based method, comprising:
transmitting data identifying a plurality of presentation components to a user computing device;
receiving, from the user computing device, a user selection of a first presentation component selected from the plurality of presentation components in response to transmitting the data identifying the plurality of presentation components;
evaluating content of the first presentation component relative to a first rule, wherein the first rule defines a presentation sequence for the first presentation component in a presentation based on the content of the first presentation component; and
inserting the first presentation component and a second presentation component selected from the plurality of presentation components into the presentation such that the second presentation component is prior in sequence to the first presentation component in response to evaluating the content of the first presentation component relative to the first rule.

10. The computer-based method of claim 9, wherein inserting the first presentation component and the second presentation component into the presentation comprises automatically inserting the second presentation component into the presentation prior in sequence to the first presentation component in response to determining to insert the first presentation component into the presentation.

11. The computer-based method of claim 9, wherein inserting the first presentation component and the second presentation component into the presentation comprises:
transmitting a request to the computing device to insert the second presentation component; and
inserting the first presentation component and the second presentation component into the presentation in response to receiving confirmation from the computing device to insert the second presentation component.

12. The computer-based method of claim 11, wherein the first presentation component is prevented from being inserted into the presentation until confirmation is received from the computing device to insert the second presentation component.

13. The computer-based method of claim 9, wherein transmitting the data identifying the plurality of presentation components comprises transmitting metadata associated with the plurality of presentation components.

14. The computer-based method of claim 9, wherein the plurality of presentation components is a first plurality of presentation components, and further comprising:
receiving user credentials of a first user from the computing device; and
identifying, based on the user credentials of the first user, the first plurality of presentation components to which the first user is authorized to access from a superset of presentation components.

15. The computer-based method of claim 14, further comprising:
receiving user credentials of a second user; and
identifying, based on the user credentials of the second user, a second plurality of presentation components to which the second user is authorized to access from the superset of presentation components.

16. At least one non-transitory computer-readable medium comprising a plurality of instructions stored thereon that, in response to execution by a server, causes the server to:
transmit data that identifies a plurality of presentation components to a computing device;
receive, from the computing device, a user selection of a first presentation component selected from the plurality of presentation components in response to transmittal of the data that identifies the plurality of presentation components;
evaluate content of the first presentation component relative to a first rule retrieved from a database, wherein the first rule defines a presentation sequence for the first presentation component in a presentation based on the content of the first presentation component; and
insert the first presentation component and a second presentation component selected from the plurality of presentation components into the presentation such that the second presentation component is prior in sequence to the first presentation component based on an evaluation of the content of the first presentation component relative to the first rule.

17. The at least one non-transitory computer-readable medium of claim 16, wherein the second presentation component is automatically inserted into the presentation prior in sequence to the first presentation component in response to a determination to insert the first presentation component into the presentation.

18. The at least one non-transitory computer-readable medium of claim 16, wherein to insert the first presentation component and the second presentation component into the presentation comprises to:
   transmit a request to the computing device to insert the second presentation component; and
   insert the first presentation component and the second presentation component into the presentation in response to receipt of confirmation from the computing device to insert the second presentation component; and
   wherein insertion of the first presentation component into the presentation is prevented until confirmation is received from the computing device to insert the second presentation component.

19. The at least one non-transitory computer-readable medium of claim 16, wherein the plurality of presentation components is a first plurality of presentation components; and
   wherein the plurality of instructions further causes the server to (i) receive user credentials of a first user from the computing device and (ii) identify, based on the user credentials of the first user, the first plurality of presentation components to which the first user is authorized to access from a superset of presentation components.

20. The at least one non-transitory computer-readable medium of claim 19, wherein the plurality of instructions further causes the server to:
   receive user credentials of a second user; and
   identify, based on the user credentials of the second user, a second plurality of presentation components to which the second user is authorized to access from the superset of presentation components.

* * * * *